United States Patent
Li et al.

(10) Patent No.: US 11,169,403 B2
(45) Date of Patent: Nov. 9, 2021

(54) FLEXIBLE MODULE WITH IMPROVED BENDING AT COF END OF PANEL THEREOF AND A METHOD FOR FABRICATING THE SAME

(71) Applicant: BOE TECHNOLOGY GROUP CO., LTD., Beijing (CN)

(72) Inventors: Hong Li, Beijing (CN); Pao Ming Tsai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 613 days.

(21) Appl. No.: 15/760,401

(22) PCT Filed: Sep. 14, 2017

(86) PCT No.: PCT/CN2017/101726
§ 371 (c)(1),
(2) Date: Mar. 15, 2018

(87) PCT Pub. No.: WO2018/161520
PCT Pub. Date: Sep. 13, 2018

(65) Prior Publication Data
US 2020/0233245 A1     Jul. 23, 2020

(30) Foreign Application Priority Data
Mar. 8, 2017  (CN) .......................... 201710135802.7

(51) Int. Cl.
*G02F 1/1333*     (2006.01)
*G09F 9/30*       (2006.01)

(52) U.S. Cl.
CPC ...... *G02F 1/1333* (2013.01); *G02F 1/133305* (2013.01); *G09F 9/301* (2013.01); *G02F 2202/28* (2013.01)

(58) Field of Classification Search
CPC . H01L 51/0097; H01L 27/3244; H01L 51/56; H01L 51/5253; H01L 27/1218;
(Continued)

(56) References Cited

U.S. PATENT DOCUMENTS 10,290,239 B2 *  5/2019  Liu .................. H05K 1/189
10,500,816 B2 * 12/2019  Xing ................ B32B 38/10
(Continued)

FOREIGN PATENT DOCUMENTS

CN        1607895 A    4/2005
CN      103257472 A    8/2013
(Continued)

OTHER PUBLICATIONS

First Office Action, issued in Chinese Patent Application No. 201710135802.7, 22 pages (dated Oct. 26, 2018).
(Continued)

*Primary Examiner* — Jia X Pan
(74) *Attorney, Agent, or Firm* — Dinsmore & Shohl LLP

(57) ABSTRACT

The present disclosure discloses a flexible module and a method for fabricating the same. The method comprises: attaching a bottom film to a back surface of a flexible panel with an adhesive layer; at least removing the bottom film on the back surface of a bending area of the flexible panel; and bending the flexible panel so that the bending area of the flexible panel bends to complete the fabrication of the flexible module.

10 Claims, 4 Drawing Sheets

(58) Field of Classification Search
CPC ....... H01L 2251/5338; G02F 1/133305; G02F 1/13338; G02F 2202/28; G02F 1/1333; A61B 5/6833; A61B 5/6832; G06F 1/1652; G06F 2203/04103; G06F 2203/04102; G09F 9/301; H05K 1/189
See application file for complete search history.

(56) References Cited

U.S. PATENT DOCUMENTS

| | | | |
|---|---|---|---|
| 10,576,719 B2* | 3/2020 | Liu | B32B 7/02 |
| 10,606,399 B2* | 3/2020 | Kim | G06F 1/1637 |
| 2010/0243134 A1 | 9/2010 | Imamura | C09J 5/06 |
| | | | 156/152 |
| 2012/0081874 A1* | 4/2012 | Wu | G02F 1/1333 |
| | | | 361/807 |
| 2014/0177182 A1 | 6/2014 | Cho | |
| 2014/0307396 A1 | 10/2014 | Lee | |
| 2015/0036300 A1 | 2/2015 | Park et al. | |
| 2017/0042047 A1* | 2/2017 | Oh | G09G 3/20 |
| 2017/0047547 A1* | 2/2017 | Son | H01L 25/167 |
| 2017/0084673 A1* | 3/2017 | Lee | H01L 51/5237 |
| 2017/0323779 A1* | 11/2017 | Um | H01L 27/1262 |
| 2017/0352834 A1* | 12/2017 | Kim | H01L 27/3276 |
| 2018/0076400 A1* | 3/2018 | Jung | B32B 7/12 |
| 2018/0114904 A1 | 4/2018 | Sun | |
| 2018/0145124 A1* | 5/2018 | Kim | H01L 27/3258 |
| 2018/0182983 A1* | 6/2018 | Bae | B32B 15/082 |
| 2018/0197933 A1* | 7/2018 | Son | H01L 27/3276 |
| 2018/0286293 A1* | 10/2018 | Liu | H05K 1/028 |
| 2018/0315804 A1* | 11/2018 | Li | H01L 51/56 |

FOREIGN PATENT DOCUMENTS

| | | |
|---|---|---|
| CN | 103713436 A | 4/2014 |
| CN | 104465479 A | 3/2015 |
| CN | 104576969 A | 4/2015 |
| CN | 106023810 A | 10/2016 |
| CN | 106450024 A | 2/2017 |
| CN | 106910428 A | 6/2017 |
| CN | 106910429 A | 6/2017 |
| JP | 2006-195309 A | 7/2006 |
| KR | 20140122595 A | 10/2014 |
| KR | 20150099470 A | 8/2015 |

OTHER PUBLICATIONS

International Search Report and Written Opinion for International Appl. No. PCT/CN2017/101726, dated Dec. 5, 2017.
Extended European Search Report dated Oct. 30, 2020, relating to EP Patent Application No. 17847761.8.

* cited by examiner

FLEXIBLE MODULE WITH IMPROVED BENDING AT COF END OF PANEL THEREOF AND A METHOD FOR FABRICATING THE SAME

CROSS-REFERENCE TO RELATED APPLICATIONS

This application is a U.S. National Stage under 35 U.S.C. § 371 of PCT/CN2017/101726, filed on Sep. 14, 2017, which claims priority to and the benefit of Chinese Patent Application No. 201710135802.7, filed on Mar. 8, 2017, the entire contents of which are hereby incorporated by reference as part of this application.

TECHNICAL FIELD

The present disclosure relates to a method for fabricating a flexible module and a flexible module.

BACKGROUND

In a flexible Active Matrix/Organic Light Emitting Diode (AMOLED) display, a touch layer (Touch), a polarizer layer(POL), a flexible panel (Panel), a bottom film (Bottom Film, attached to the Panel through optical adhesive (OCA)) and the like are laminated together. In order to achieve a narrow frame, the Panel can be bent at its COF end (the end connected to an external circuit including a flexible circuit board (FPC)). Due to stress problems between the Panel and the Bottom Film at the bending portion (e.g., uneven Panel stress), problems, for example, the Panel cannot be completely bent or the metal pad (e.g., metal traces or electrodes on the Panel) may be broken, may arise and may damage the Panel.

SUMMARY

In an aspect of the present disclosure, there is provided a method for fabricating a flexible module, the method comprising: attaching a bottom film to a back surface of a flexible panel with an adhesive layer; at least removing the bottom film on the back surface of a bending area of the flexible panel; and then bending the flexible panel so that the bending area of the flexible panel bends to complete the fabrication of the flexible module.

In an example, attaching a bottom film to a back surface of a flexible panel with an adhesive layer comprises: forming a low surface energy layer on the back surface of the bending area of the flexible panel, and then adhering the bottom film to the back surface of the flexible panel with a first adhesive glue; wherein the first adhesive glue forms the adhesive layer; and at least removing the bottom film on the back surface of the bending area of the flexible panel comprises: removing the bottom film and the first adhesive glue on the back surface of the bending area of the flexible panel.

In an example, forming a low surface energy layer on the back surface of the bending area of the flexible panel, and then adhering the bottom film to the back surface of the flexible panel with the first adhesive glue comprise:

forming a low surface energy layer on the back surface of the bending area of the at least one flexible panel of a polyimide substrate, and then adhering the bottom film to the back surface of the polyimide substrate with the first adhesive glue; and trimming the at least one flexible panel on the polyimide substrate.

In an example, the low surface energy layer is a monomolecular film layer.

In an example, attaching a bottom film on the back surface of a flexible panel with an adhesive layer comprises:

coating a glue A on the back surface of a non-bending area of the flexible panel, and then adhering the bottom film on the back surface of the flexible panel with a glue B;

wherein one of the glue A and glue B is a body glue and the other is a curing agent used in combination with the body glue, and the glue A and glue B in contact with each other are cured to form the adhesive layer; and removing at least the bottom film on the back surface of the bending area of the flexible panel comprises removing the glue B and the bottom film on the back surface of the bending area of the flexible panel.

In an example, coating a glue A on the back surface of a non-bending area of the flexible panel, and then adhering the bottom film on the back surface of the flexible panel with a glue B comprise:

coating the glue A on the back surface of the non-bending area of at least one flexible panel of a polyimide substrate, and then adhering the bottom film on the back surface of the polyimide substrate with the glue B;

trimming the at least one flexible panel on the polyimide substrate.

In an example, a glue A layer formed by the glue A is a monomolecular film layer.

In an example, the adhesive layer is an adhesive layer formed by an optical glue, and the method for fabricating the flexible module further includes: curing the optical glue.

In another aspect of the present disclosure, there is provided a flexible module, comprising: a flexible panel having a bending area and a non-bending area thereon; an adhesive layer; and a bottom film; wherein the adhesive layer adheres the bottom film to the back surface of the non-bending area of the flexible module, and the adhesive layer and the bottom film have a cross-section at a junction of the bending area and the non-bending area of the flexible panel.

In an example, the back surface of the bending area of the flexible panel has a low surface energy layer, and the back surface of the non-bending area of the flexible panel has an adhesive layer formed from a first adhesive glue; or the non-bending area of the flexible panel has the adhesive layer formed by curing a glue A and a glue B.

In an example, a touch layer is disposed on the front surface of the non-bending area of the flexible panel, and a polarizer is disposed on the touch layer.

Additional features and advantages of the disclosure will be set forth in the description which follows, and in part will be obvious from the description, or may be learned by practice of the disclosure. The objectives and other advantages of the disclosure may be realized and attained by the structure particularly pointed out in the written description and claims hereof as well as the appended drawings.

BRIEF DESCRIPTION OF THE DRAWINGS

The drawings as demonstrated here are used to provide further understandings on the present disclosure and form a part of the present disclosure. Illustrative examples of the present disclosure and interpretations thereon are used to interpret the present disclosure but shall not unduly limit the present disclosure.

DETAILED DESCRIPTION

Figure 1:
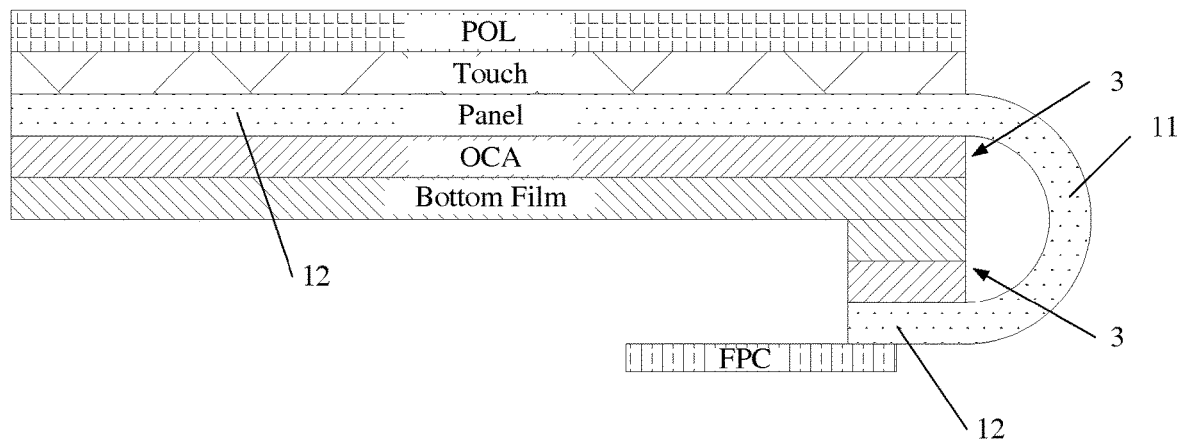
FIG. 1 is a schematic structural view of a flexible module according to an embodiment of the present disclosure.

In order to make the purpose, technical solutions and advantages of the present disclosure more comprehensible, the embodiments herein will be described in detail below with reference to the accompanying drawings. It should be noted that, in the case of no conflict, the embodiments in the present application and the features in the embodiments may be arbitrarily combined with each other.

In the following description, numerous specific details are set forth in order to provide a thorough understanding of the present document. However, the present disclosure may also be implemented in other manners different from those described herein, and the scope of protection herein is not limited by the specific embodiments disclosed below.

The present disclosure provides a method for fabricating a backlight module. The COF end of the Panel can be bent better, and there is no problem of uneven stress after bending, so that the problems such as insufficient bending at the COF end and metal pad breaking will not take place and thus a better practicality is achievable.

Some embodiments of the flexible module and its fabricating method according to the present disclosure will be described below with reference to the accompanying drawings herein.

The method for fabricating a flexible module provided by the present disclosure comprises: attaching a bottom film to a back surface of a flexible panel with an adhesive layer; at least removing the bottom film on the back surface of a bending area 11 of the flexible panel; and then bending the flexible panel so that the bending area 11 of the flexible panel bends to make a COF end of the flexible panel to bend to the back of the flexible panel (i.e. disposing an end of flexible panel connected to a flexible circuit board (FPC) to the back of the flexible panel), so as to complete the fabrication of the flexible module.

The fabricating method of the flexible module provided by the present disclosure at least removes the bottom film on the back surface of the bending area of the flexible panel and then bend the flexible panel, such that bending of the bending area (i.e. COF end of the flexible panel, used for completing the bonding of the FPC) of the flexible panel takes place, the bending area of the flexible panel after bending shows balanced stress at various positions due to absence of the restriction of a back plate; when the bending area of the flexible panel bends, the phenomenon of an incomplete bending caused by uneven stress or breaking of the metal pad of the bending area on the flexible panel will not happen, and the COF end of the flexible panel is more easily folded back completely, so that the narrow frame can be realized better.

In a specific embodiment of the present disclosure, attaching a bottom film on the back surface of a flexible panel with an adhesive layer comprises:

forming a low surface energy layer on the back surface of the bending area 11 of the flexible panel, and then adhering the bottom film to the back surface of the flexible panel with a first adhesive glue; wherein the first adhesive glue forms the adhesive layer; and removing at least the bottom film on the back surface of the bending area of the flexible panel comprises:

removing the bottom film and the first adhesive glue on the back surface of the bending area 11 of the flexible panel.

The adhesive force between the low surface energy layer (which may be formed by coating with a low surface energy material) and the first adhesive glue is relatively weak, and this is helpful to remove the adhesive layer and the bottom film of the bending area 11.

The low surface energy layer may be a monomolecular film layer which is autonomously formed in the bending area 11 of the flexible panel and has Hydrophobic functional groups (such as a carbon nanotube film superhydrophobic material having a columnar structure array of lipids, release agents, etc.). Specifically, a monomolecular film layer composed of perfluorododecanoic acid is deposited on the bending area 11 of the flexible panel to obtain a film with a low surface energy, the surface of which is fully covered by —CF3 and the surface has a super-hydrophobic property, and the adhesive layer formed by the first adhesive glue will not be bonded.

Moreover, the thickness of the monomolecular film layer is small and the area of the bending area 11 is also small, so that there is no breaking offset and there is no impact on the bonding of the bottom film.

Figure 3:
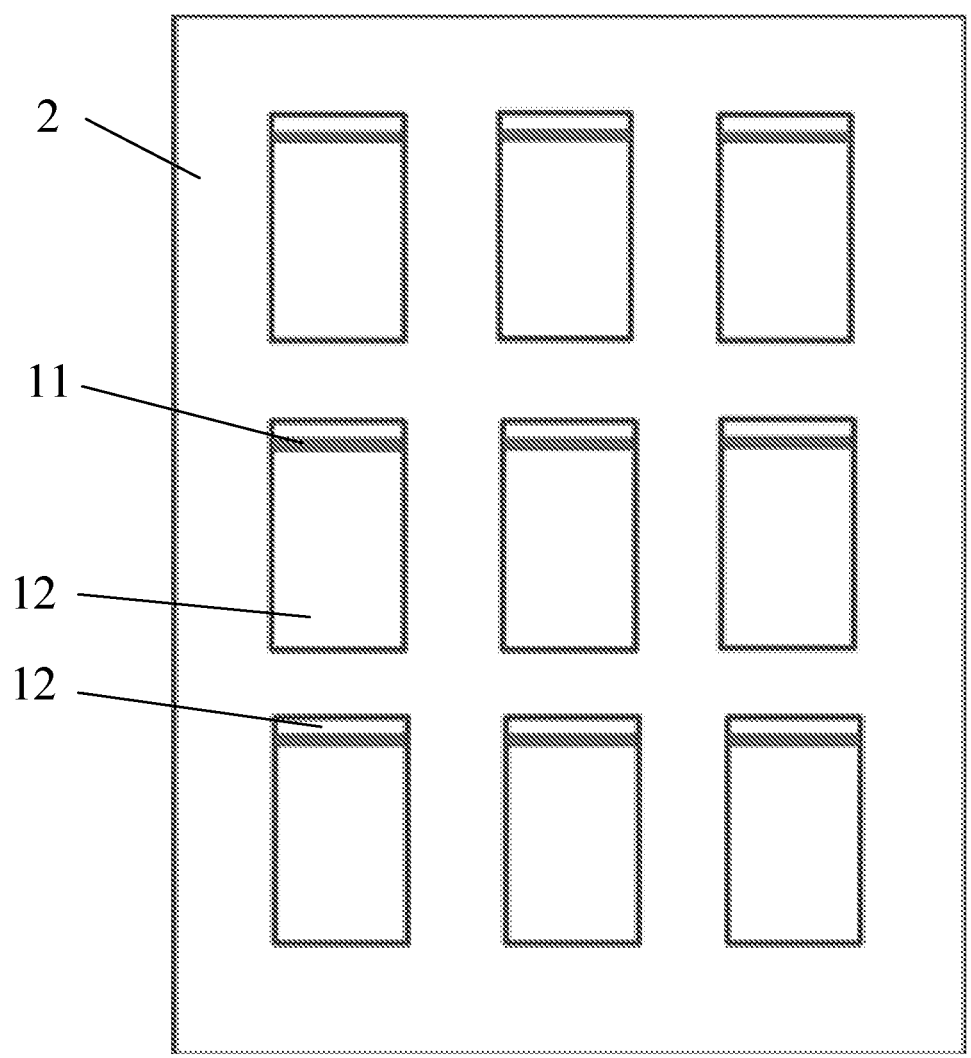
FIG. 3 is a schematic structural diagram of the polyimide substrate in the present disclosure, which includes 9 Panels.

The bottom film may be directly adhered to a separate flexible panel through an adhesive layer or may be adhered to a polyimide substrate 2 through an adhesive layer and then the polyimide substrate 2 may be trimmed according to the flexible panel on the polyimide substrate 2 (if the number of the flexible panels on the polyimide substrate 2 is 5, 6, 7, 9 or the like, (as shown in FIG. 3, the polyimide substrate in FIG. 3 includes 9 flexible panels), then 5, 6, 7 or 9 flexible panels will be trimmed) to increase productivity. An example method comprises:

coating on the back surface of the bending area 11 of the at least one flexible panel of the polyimide substrate 2 to form a low surface energy layer, and then adhering the bottom film to the back surface of the polyimide substrate 2 with a first adhesive glue;

trimming the at least one flexible panel on the polyimide substrate 2;

removing the adhesive layer and the bottom film on the back surface of the bending area 11 of the at least one panel and bending the at least one panel such that the bending area 11 of the at least one panel is bent and deformed to complete the fabrication of the at least one flexibility module.

In an example, the low surface energy layer is a monomolecular film layer. The back surface of the panel corresponds to the back surface of the produced display device. The front surface of the panel corresponds to the front surface of the produced display device. The front surface of the panel may be provided with a fingerprint recognition structure, a display structure or a touch structure, for example, a Touch layer (Touch), a Polarizer (POL) and the like are arranged in sequence on the front surface of the non-bending area 12 of the panel.

In another embodiment of the present disclosure, attaching a bottom film to a back surface of a flexible panel with an adhesive layer comprises:

coating a glue A on the back surface of the non-bending area 12 of the flexible panel, and then adhering the bottom film to the back surface of the flexible panel with glue B;

wherein one of the glue A and glue B is a body glue and the other is a curing agent used in combination with the body glue, and the glue A and glue B in contact with each other are cured to form the adhesive layer; and at least removing the bottom film on the back surface of the bending area 11 of the flexible panel comprises:

removing the glue B and the bottom film on the back surface of the bending area 11 of the flexible panel.

In the same way as in the previous embodiment, the above operations may be performed on an independent single panel or may be performed on the polyimide substrate 2, which should all fall within the protection scope of the present application.

Specifically, coating a glue A on the back surface of the non-bending area 12 of the flexible panel, and then adhering the bottom film on the back surface of the flexible panel with a glue B comprise:

coating the glue A on the back surface of the non-bending area 12 of at least one flexible panel of the polyimide substrate, and then adhering the bottom film on the back surface of the polyimide substrate with the glue B; and trimming the at least one flexible panel on the polyimide substrate.

In an example, a glue A layer formed by the glue A is a monomolecular film layer. The front surface of the flexible panel may be provided with a fingerprint recognition structure, a display structure or a touch structure, for example, a Touch layer (Touch), a Polarizer (POL) and the like are arranged in sequence on the front surface of the non-bending area 12 of the flexible panel.

One of the glue A and glue B is a body glue, the other one is a curing agent used in combination with the body glue, and the two glues are mixed, cured and bonded; and in the bending area of the flexible panel, only glue B exists while there is no glue A, and thus in this case, glue B itself does not cure to form an adhesive layer, which makes it easy to remove glue B.

Glue A and glue B may have acrylic, epoxy, polyurethane ingredients or the like. The commonly used refers to acrylic modified epoxy glue or epoxy glue. Component A is an acrylic-modified epoxy or epoxy resin, or contains catalysts and other auxiliaries, component B is a modified amine or another hardener, or contains catalysts and other adjuvants. The two components are mixed in a certain ratio, the catalyst can control the curing time, and other additives can control the properties such as viscosity, rigidity, flexibility and adhesiveness.

The first adhesive glue is a kind of optical glue, and glue A and glue B are also one kind of optical glue. The adhesive layer is an adhesive layer formed by optical glue, and the fabricating method of the flexible module further includes: curing the optical adhesive such that the bottom film and the back surface of the flexible panel are more firmly adhered to each other. This can be performed before or after removing the bottom film on the back of the bend area.

Figure 2:
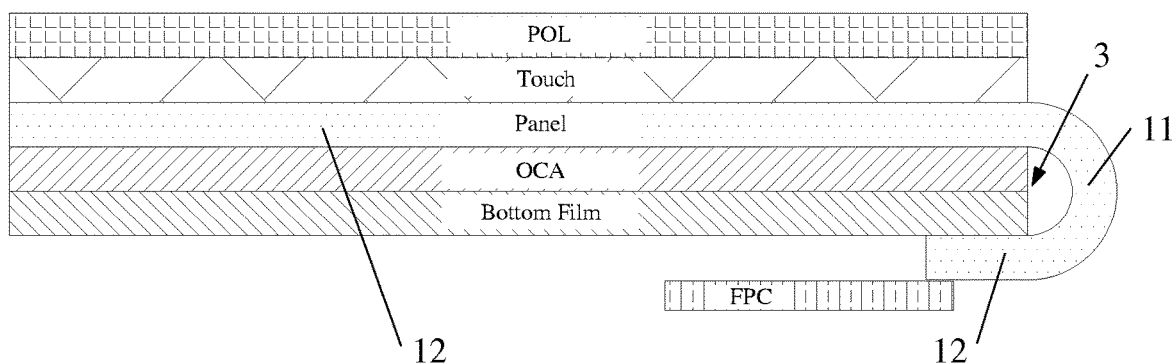
FIG. 2 is a schematic structural view of a flexible module according to another embodiment of the present disclosure.

As shown in FIG. 1 and FIG. 2, the flexible module provided in the present disclosure comprises: a Panel having a bending area 11 and a non-bending area 12 thereon; an adhesive layer adhering the Bottom Film to the back surface of the non-bending area 12 of the Panel; and the adhesive layer and the Bottom Film have a cross-section 3 at a junction of the bending area 11 and the non-bending area 12 of the panel; and the Bottom Film.

The bending area 11 of the Panel has no Bottom Film and bonding layer, which not only facilitates bending but also the stress of the bending area 11 after bending is more balanced, and the metal pad of the bending area 11 in the Panel does not have the problem of breaking or the like.

Specifically, as shown in FIG. 1, the non-bending area 12 includes two portions, and the two portions of the non-bending area 12 are located on both sides of the bending area 11, and both of the two portions of the non-bending areas 12 are provided with an adhesive layer and a bottom film (the Bottom Film can be stuck together, and can also be adhered together). Alternatively, as shown in FIG. 2, the non-bending area 12 includes two portions, and the two portions of the non-bending area 12 are located on both sides of the bending area 11. The non-bending area folded along with the bending area 11 is not provided with the Bottom Film and the adhesive layer, and is disposed on the Bottom Film on the back of the other non-bending area after being folded (such as adhered to the Bottom Film on the back of another non-bending area) to share the Bottom Film.

Figure 4:
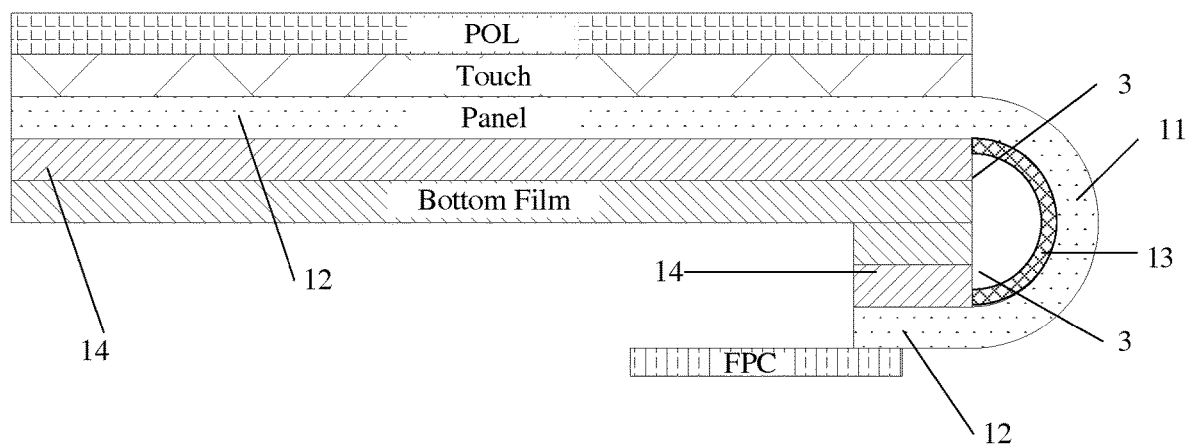
FIG. 4 is a schematic structural view of a flexible module according to another embodiment of the present disclosure.
Figure 5:
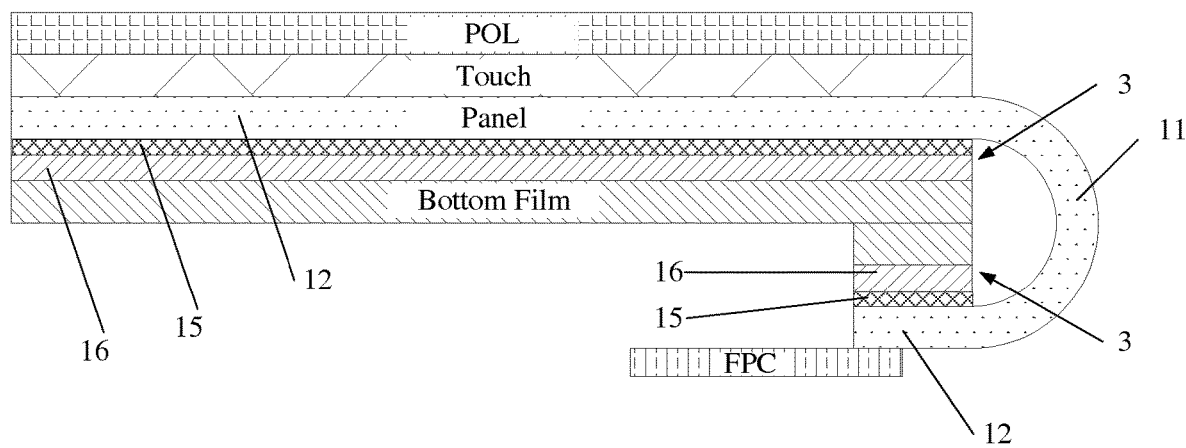
FIG. 5 is a schematic structural view of a flexible module according to another embodiment of the present disclosure.

In an example, the bending area 11 of the Panel (the gray area in FIG. 3 is only for better showing the location of the bending area 11) has a low surface energy layer 13 (as shown in FIG. 4). The back surface of the non-bending area 12 of the panel has an adhesive layer formed by a first adhesive glue 14 (as shown in FIG. 4); or the non-bending area 12 of the Panel has an adhesive layer formed by curing a layer of glue A 15 (see FIG. 5) and a layer of glue B 16 (see FIG. 5).

In an example, the OCA and the Bottom Film are located on a back surface of the Panel, and a fingerprint identification structure, a display structure or a touch structure may be disposed on a front surface of the Panel, for example, the front surface of the non-bending area 12 of the Panel has a touch layer, and a polarizer is combined on the touch layer.

Touch is the touch layer, POL is the polarizer, Bottom Film is the bottom film, OCA is the optical glue, Panel is the flexible panel, FPC is the flexible circuit board, and the metal Pad is the metal wire or the electrode.

In view of the above, the fabricating method of the flexible panel provided by the present disclosure at least removes the bottom film on the back surface of the bending area of the flexible panel and then bends the flexible panel, such that bending deformation of the bending area of the flexible panel (i.e. the COF end of the flexible panel) takes place, the bending area of the flexible panel after bending shows balanced stress. When the bending area of the flexible panel bends, the phenomenon of an incomplete bending caused by uneven stress or breaking of the metal pad of the bending area on the flexible panel will not happen, and the COF end of the flexible panel is more easily folded back completely, so that the narrow frame can be realized better.

In the description herein, the terms "installed", "coupled", "connected," "fixed" and the like should be broadly understood. For example, "connected" may be a fixed connection, a detachable connection or an integral connection; it can be a direct connection or an indirect connection through intermediary. For those skilled in the art, the meanings of the above terms in this specification may be understood according to the specific situation.

In the description of the present specification, the description of the terms "one embodiment", "some embodiments", "specific embodiments", etc. means that a particular feature, structure, material, or characteristic described in connection with the embodiment or example is incorporated herein by reference in at least one embodiment or example. In this specification, the schematic representation of the above terms does not necessarily refer to the same embodiment or example. Furthermore, the particular features, structures, materials, or characteristics described may be combined in any suitable manner in any one or more embodiments or examples.

Although the embodiments disclosed herein are the same as the above, the content described herein is only used for understanding the present disclosure, and is not intended to limit the disclosure herein. Any person skilled in the art may make any modification or change in the form and details of the implementation without departing from the spirit and scope of the disclosure herein, but the scope of the patent protection herein still needs to be attached The scope of the claims shall prevail.

What is claimed is:

1. A method for fabricating a flexible module, comprising,
    attaching a bottom film to a back surface of a flexible panel with an adhesive layer, wherein the flexible panel has a bending area and a non-bending area adjacent to the bending area, and wherein the attaching comprises:
        forming a low surface energy layer on the back surface of the bending area of the flexible panel, and then adhering the bottom film to the back surface of the flexible panel with a first adhesive glue;
        wherein the first adhesive glue forms the adhesive layer; and
    at least removing a portion of the bottom film on the back surface of the bending area of the flexible panel, comprising:
        removing a portion of the adhesive layer and the portion of the bottom film on the back surface of the bending area of the flexible panel; and
    bending the flexible panel so that the bending area of the flexible panel bends to complete fabrication of the flexible module.

2. The method for fabricating a flexible module according to claim 1,
    wherein a plurality of flexible panels including the flexible panel are arranged on a polyimide substrate,
    wherein forming the low surface energy layer on the back surface of the bending area of the flexible panel, and then adhering the bottom film to the back surface of the flexible panel with the first adhesive glue comprise:
        forming the low surface energy layer on a back surface of a bending area of at least one flexible panel of the plurality of flexible panels, and then adhering the bottom film to the back surface of the polyimide substrate with the first adhesive glue; and
        trimming the at least one flexible panel on the polyimide substrate.

3. The method for fabricating a flexible module according to claim 1, wherein the low surface energy layer is a monomolecular film layer.

4. A method for fabricating a flexible module comprising:
    attaching a bottom film to a back surface of a flexible panel with an adhesive layer, wherein the flexible panel has a bending area and a non-bending area adjacent to the bending area, and wherein the attaching comprises:
        coating a glue A on the back surface of the non-bending area of the flexible panel, and adhering the bottom film to the back surface of the flexible panel with a glue B;
        wherein one of the glue A and the glue B is a body glue and the other is a curing agent used in combination with the body glue, and the glue A and the glue B in contact with each other are cured to form the adhesive layer; and
        removing a portion of the glue B on the back surface of the bending area of the flexible panel and a portion of the bottom film on the portion of glue B.

5. The method for fabricating a flexible module according to claim 4,
    wherein a plurality of flexible panels including the flexible panel are arranged on a polyimide substrate,
    wherein coating the glue A on the back surface of the non-bending area of the flexible panel, and then adhering the bottom film on the back surface of the flexible panel with the glue B comprise:
        coating the glue A on a back surface of a non-bending area of at least one flexible panel of the plurality of flexible panels, and then adhering the bottom film on the back surface of the polyimide substrate with the glue B; and
        trimming the at least one flexible panel on the polyimide substrate.

6. The method for fabricating a flexible module according to claim 4, wherein a glue A layer formed by the glue A is a monomolecular film layer.

7. A flexible module manufactured by the method of claim 1, comprising:
    the flexible panel having the bending area and the non-bending area thereon;
    the adhesive layer; and
    the bottom film;
    wherein the adhesive layer adheres the bottom film to a back surface of the non-bending area of the flexible panel, and the adhesive layer and the bottom film have a cross-section at a junction of the bending area and the non-bending area of the flexible panel, and wherein the back surface of the bending area of the flexible panel has the low surface energy layer, and the back surface of the non-bending area of the flexible panel has the adhesive layer.

8. A flexible module manufactured by the method of claim 4, comprising:
    the flexible panel having a bending area and a non-bending area thereon;
    the adhesive layer; and
    the bottom film;
    wherein the adhesive layer adheres the bottom film to the back surface of the non-bending area of the flexible panel, and the adhesive layer and the bottom film have a cross-section at a junction of the bending area and the non-bending area of the flexible panel, and wherein the non-bending area of the flexible panel has the adhesive layer formed by cured glue A and glue B, wherein one of the glue A and the glue B is a body glue and the other is a curing agent used in combination with the body glue, and the glue A and the glue B in contact with each other are cured to form the adhesive layer.

9. The flexible module according to claim 7, wherein a touch layer is disposed on a front surface of the non-bending area of the flexible panel, and a polarizer is disposed on the touch layer.

10. The flexible module according to claim 8, wherein a touch layer is disposed on a front surface of the non-bending area of the flexible panel, and a polarizer is disposed on the touch layer.

* * * * *